United States Patent
Kim

(10) Patent No.: US 10,660,004 B2
(45) Date of Patent: May 19, 2020

(54) METHOD FOR CONTROLLING HETEROGENEOUS NETWORK HANDOVER AND APPARATUS THEREFOR

(71) Applicant: KT CORPORATION, Gyeonggi-do (KR)

(72) Inventor: Ha Sung Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/343,819

(22) PCT Filed: Jan. 11, 2018

(86) PCT No.: PCT/KR2018/000518
§ 371 (c)(1),
(2) Date: Apr. 22, 2019

(87) PCT Pub. No.: WO2018/131904
PCT Pub. Date: Jul. 19, 2018

(65) Prior Publication Data
US 2019/0253944 A1  Aug. 15, 2019

(30) Foreign Application Priority Data

Jan. 12, 2017 (KR) .................. 10-2017-0005590
Jan. 9, 2018 (KR) .................. 10-2018-0002947

(51) Int. Cl.
*H04W 36/14* (2009.01)
*H04W 36/08* (2009.01)
(Continued)

(52) U.S. Cl.
CPC ....... *H04W 36/14* (2013.01); *H04W 36/0072* (2013.01); *H04W 36/0085* (2018.08);
(Continued)

(58) Field of Classification Search
CPC ..... H04W 36/14; H04W 36/38; H04W 36/30; H04W 36/0085; H04W 36/08;
(Continued)

(56) References Cited

U.S. PATENT DOCUMENTS

2008/0291874 A1\* 11/2008 Bae .................. H04W 36/0022
370/331
2008/0305799 A1  12/2008 Zuniga et al.
(Continued)

FOREIGN PATENT DOCUMENTS

| WO | 2012/033316 A2 | 3/2012 |
| WO | 2013/012156 A1 | 1/2013 |
| WO | 2015/108337 A1 | 7/2015 |

OTHER PUBLICATIONS

3GPP, 3rd Generation Partnership Project; Technical Specification Group Services and System Aspects; Study on Architecture for Next Generation System (Release 14), 3GPP TR 23.799 V1.2.0 (Nov. 2016), pp. 1-529.

*Primary Examiner* — Nimesh Patel
(74) *Attorney, Agent, or Firm* — IP Legal Services, LLC

(57) ABSTRACT

Provided are apparatus and methods for controlling a handover of a user equipment between base stations each belonging to a network different from the other. The method includes: i) determining whether the user equipment should be handed over to a target base station belonging to a heterogeneous network based on measurement information received from the user equipment, ii) transmitting a handover required message containing identification information of the target base station to a core network entity linked to the source base station, when it is determined that the user equipment should be handed over, iii) receiving a handover command message containing evolved packet system (EPS) bearer setup list information of the target base station from
(Continued)

the core network entity, and iv) transmitting the handover command message to the user equipment.

12 Claims, 9 Drawing Sheets

(51) Int. Cl.
 *H04W 36/00* (2009.01)
 *H04W 36/30* (2009.01)
 *H04W 36/38* (2009.01)
(52) U.S. Cl.
 CPC .......... *H04W 36/08* (2013.01); *H04W 36/30* (2013.01); *H04W 36/38* (2013.01); *H04W 36/0033* (2013.01)
(58) Field of Classification Search
 CPC ......... H04W 36/0033; H04W 36/0072; H04W 76/30; H04W 84/045; H04W 36/0044; H04W 36/24; H04W 88/16; H04W 8/02; H04W 28/22; H04W 36/00; H04W 36/0022; H04W 36/32; H04W 8/04; H04W 48/08; H04W 88/02; H04W 8/082; H04W 36/0083; H04W 24/10; H04W 36/0058; H04W 36/0061; H04W 36/26; H04W 68/02; H04W 28/0268; H04W 36/00837; H04W 76/11; H04W 80/10; H04W 88/10; H04W 88/06; H04W 84/12; H04W 28/0289; H04W 28/08; H04W 60/005; H04W 28/0226; H04W 28/0252; H04W 36/0066; H04W 72/0486; H04W 76/27; H04W 24/02; H04W 28/12; H04W 8/08; H04W 12/04; H04W 12/08; H04W 36/0088; H04W 40/244; H04W 48/14; H04W 48/18; H04W 4/029; H04W 60/04; H04W 72/02; H04W 74/02; H04W 74/04; H04W 74/08; H04W 48/04; H04W 8/18; H04W 8/24; H04W 36/0016; H04W 36/165; H04W 72/10; H04W 76/15; H04W 84/02; H04W 8/06; H04W 92/20; H04W 36/023; H04W 36/0011; H04W 36/0055; H04W 16/32; H04W 28/0257; H04W 28/06; H04W 36/0069; H04W 36/18; H04W 72/0433; H04W 72/085; H04W 36/0038; H04W 36/06; H04W 36/10; H04W 4/00; H04W 92/22; H04L 61/2007; H04L 1/00; H04L 5/0055; H04L 12/1407; H04L 47/14; H04L 47/20; H04L 65/1006; H04L 65/1016; H04L 61/2592; H04L 12/4633; H04L 47/11; H04L 47/12; H04L 61/6077; H04L 1/0026; H04L 47/2441; H04L 5/0057; H04L 63/0853; H04L 1/1896; H04L 69/322; H04L 67/2842; H04L 12/1435; H04L 43/065; H04L 63/029; H04L 63/0428; H04L 63/0892; H04M 15/66; H04M 15/00; H04M 15/70; H04M 15/80; H04M 15/8038; H04M 15/58; Y02D 70/00; Y02D 70/1222; Y02D 70/1224; Y02D 70/1226; Y02D 70/1242; Y02D 70/1262; Y02D 70/1264; Y02D 70/142; Y02D 70/144; Y02D 70/146; Y02D 70/166; Y02D 70/21; Y02D 70/22; Y02D 70/23; Y02D 30/30; Y02D 70/10; Y02D 70/12
 See application file for complete search history.

(56) References Cited

U.S. PATENT DOCUMENTS

| | | | | |
|---|---|---|---|---|
| 2009/0129342 | A1* | 5/2009 | Hwang | H04W 36/0022 370/331 |
| 2010/0208704 | A1* | 8/2010 | Wu | H04L 12/66 370/331 |
| 2011/0009121 | A1* | 1/2011 | Yu | H04W 68/12 455/439 |
| 2011/0211559 | A1* | 9/2011 | Lim | H04W 36/02 370/331 |
| 2011/0275374 | A1* | 11/2011 | Narasimha | H04L 5/0007 455/436 |
| 2012/0142354 | A1* | 6/2012 | Ahluwalia | H04W 74/0833 455/436 |
| 2013/0034081 | A1 | 2/2013 | Ban et al. | |
| 2013/0058308 | A1* | 3/2013 | Jaiswal | H04W 36/12 370/331 |
| 2013/0102270 | A1* | 4/2013 | Suh | H04W 12/00 455/404.1 |
| 2013/0128864 | A1 | 5/2013 | Kim | |
| 2013/0170389 | A1 | 7/2013 | Jee et al. | |
| 2014/0307708 | A1* | 10/2014 | Son | H04W 36/0055 370/331 |
| 2015/0043435 | A1* | 2/2015 | Blankenship | H04L 69/322 370/329 |
| 2015/0092665 | A1* | 4/2015 | Choi | H04W 36/08 370/328 |
| 2015/0296431 | A1* | 10/2015 | Li | H04W 36/0066 370/331 |
| 2016/0057687 | A1* | 2/2016 | Horn | H04W 24/10 370/331 |
| 2016/0323805 | A1 | 11/2016 | Ryu et al. | |
| 2017/0142624 | A1* | 5/2017 | Brown | H04W 36/12 |

\* cited by examiner

METHOD FOR CONTROLLING HETEROGENEOUS NETWORK HANDOVER AND APPARATUS THEREFOR

CROSS REFERENCE TO RELATED APPLICATIONS

This application is a National Stage Patent Application of PCT International Patent Application No. PCT/KR2018/000518 (filed on Jan. 11, 2018) under 35 U.S.C. § 371, which claims priority to Korean Patent Application Nos. 10-2017-0005590 (filed on Jan. 12, 2017) and 10-2018-0002947 (filed on Jan. 9, 2018), the teachings of which are incorporated herein in their entireties by reference.

TECHNICAL FIELD

The present disclosure relates to a technology for controlling a handover of a user equipment between base stations each belonging to a network different from the other. More specifically, the present disclosure relates to a method and procedure for performing a handover of a user equipment between a base station employing a 5G technology and a base station employing an LTE technology.

BACKGROUND ART

In the typical long term evolution (LTE), bearer management for interworking between an LTE base station and an evolved packet core (EPC), which is a core network, is supported through an S1 interface and application protocols.

Meanwhile, with a 5G network introduced newly, it is essentially needed to provide mobility between 5G base stations. Especially, in case a 5G base station uses an mmWave frequency of a high-frequency band (e.g., 28 GHz), it is expected that the coverage of the base station will be further reduced due to the characteristics of the frequency. In the 5G network, a user equipment may move more frequently between base stations. Therefore it is very important to provide a handover procedure for addressing such an issue.

In addition, in case a base station employing a 5G radio access technology is deployed in a coverage area where a base station employing a typical LTE radio access technology is located, there is a distinct possibility that a handover between the LTE base station and the 5G base station may occur frequently.

In such a situation, unlike transmission on a bearer basis between an LTE core network and an LTE base station, in the 5G, it is possible to control quality on a quality of service (QoS) flow basis. It is also possible to transmit packet data between a 5G core network (hereinafter, referred to as 5G core, 5G core network, NGC or 5GC) and a 5G base station (hereinafter, referred to as 5G NB, NR NB, NG-RAN or gNB) through a packet data unit (PDU) session containing the QoS flow.

Thus, it is necessary to enable a user equipment to perform a handover in a heterogeneous network environment where different radio access technologies are employed and different core systems are installed. It is also necessary to develop technologies for efficiently controlling a handover in the heterogeneous network environment according to characteristics of the different networks.

DETAILED DESCRIPTION OF THE INVENTION

Technical Problem

To address the above issues, methods and apparatuses are provided for supporting a handover of a user equipment in a communication network environment where a source base station and a target base station employ heterogeneous network technologies.

In addition, methods and apparatuses are provided for supporting a handover of a user equipment between different core network entities in case the user equipment performs the handover between heterogeneous networks.

Technical Solution

In accordance with one aspect of the present disclosure to address the above issues, a method of a source base station is provided for controlling a handover of a user equipment between heterogeneous networks. The method includes: i) determining whether the user equipment should be handed over to a target base station belonging to a heterogeneous network based on measurement information received from the user equipment, ii) transmitting a handover required message containing identification information of the target base station to a core network entity linked to the source base station, when it is determined that the user equipment should be handed over, iii) receiving a handover command message containing evolved packet system (EPS) bearer setup list information of the target base station from the core network entity, and iv) transmitting a handover command message to the user equipment.

In accordance with another aspect of the present disclosure, a method of a core network entity is provided for controlling a handover of a user equipment between heterogeneous networks. The method includes: i) determining a type of handover or a core network entity linked to a target base station, to which a forward relocation request message is transmitted, using identification information of the target base station contained in a handover required message, ii) converting user equipment context stored for the user equipment to evolved packet core (EPC) user equipment context, iii) transmitting the forward relocation request message containing the identification information of the target base station and the EPC user equipment context to the core network entity linked to the target base station, iv) receiving a forward relocation response message containing evolved packet system (EPS) bearers setup list information of the target base station from the core network entity linked to the target base station, and v) transmitting a handover command message containing the EPS bearer setup list information of the target base station to a source base station.

In accordance with further another aspect of the present disclosure, a source base station is provided for controlling a handover of a user equipment between heterogeneous networks. The source base station includes: a controller configured to determine whether the user equipment should be handed over to a target base station belonging to a heterogeneous network based on measurement information received from the user equipment, a transmitter configured to transmit a handover required message containing identification information of the target base station to a core network entity linked to the source base station, when it is determined that the user equipment should be handed over, and a receiver configured to receive a handover command message containing evolved packet system (EPS) bearer setup list information of the target base station from the core network entity, wherein the transmitter further transmits a handover command message to the user equipment.

In accordance with still another aspect of the present disclosure, a core network entity is provided for controlling a handover of a user equipment between heterogeneous networks. The core network entity includes: a controller configured to i) determine a type of handover or a core network entity linked to a target base station, to which a forward relocation request message is transmitted, using identification information of the target base station contained in a handover required message, and ii) convert user equipment context stored for the user equipment to evolved packet core (EPC) user equipment context, a transmitter configured to transmit the forward relocation request message containing the identification information of the target base station and the EPC user equipment context to the core network entity linked to the target base station, and a receiver configured to receive a forward relocation response message containing evolved packet system (EPS) bearer setup list information of the target base station from the core network entity linked to the target base station, wherein the transmitter transmits a handover command message containing the EPS bearer setup list information of the target base station to a source base station.

Effects of the Invention

In accordance with embodiments of the present disclosure, it is possible to perform efficiently a handover of a user equipment between base stations each employing a network technology different from the other.

Further, in accordance with embodiments of the present disclosure, it is possible to provide a method and procedure for supporting a handover of a user equipment between core network entities each configured into different networks from the other.

BEST MODE FOR CARRYING OUT THE INVENTION

Figure 1:
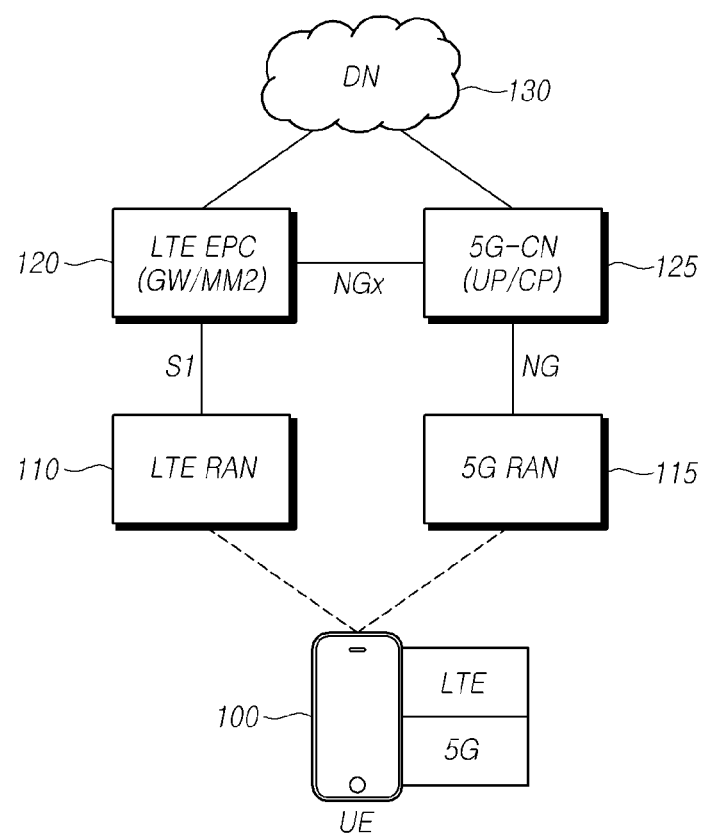
FIG. 1 is a diagram illustrating inter-System mobility, inter-RAT mobility and an interworking structure between networks each employing different network technologies from the other.

Hereinafter, the present preferred embodiments of the disclosure will be described in detail with reference to the accompanying drawings. In adding reference numerals to elements in each drawing, the same elements will be designated by the same reference numerals, if possible, although they are shown in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms and provides a corresponding communication service area, such as a megacell, a macrocell, a microcell, a picocell, a femtocell, and a small cell, or 2) the base station may be referred to a communication service area. In the case of 1), the base station may be referred to i) apparatuses that form and provide any corresponding communication service area, and are controlled by the same entity, or ii) apparatus that interact and cooperate with each other for forming and providing the corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station of the present disclosure are entities of performing uplink and downlink communications used to embody the technology and technical conceptions described in the present disclosure. The UE and the base station are defined as a generic term and not limited to a specific term or word.

Herein, the uplink (UL) refers to data transmission/reception by a UE to/from a base station, and the downlink (DL) refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE, and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting ☐) DL control information, such as scheduling required to receive a DL data channel that is a primary physical channel for unicast transmission, and ☐) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) UE category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims to improve indoor coverage, to support large-scale low-speed terminals, to lower latency sensitivity, terminal costs, and power consumption, and to optimize network architecture.

An enhanced mobile broadband (eMBB), massive machine-type communication (mMTC), and ultra-reliable and low latency communication (URLLC) are proposed as representative usage scenarios for NR having been discussed in the 3GPP recently.

A 5G technology denotes all network technologies satisfying 5G requirements of international telecommunication union (ITU). The 5G technology is described as meaning including both NR newly developed by 3GPP and eLTE being improvement on the typical LTE technology in order to meet 5G requirements.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

Meanwhile, the term "NR" or "5G" is described as meaning encompassing new network technologies meeting the 5G requirements described above. In addition, a radio access technology different from the NR are described as a typical LTE technology.

A 5G network includes a 5G core network (hereinafter, referred to as 5GC, 5G CN, NGC etc.) and a 5G wireless access network (hereinafter, referred to as NG-RAN, 5G-RAN etc.), which are separated from each other. The NG-RAN may include a set of one or more 5G NBs (gNBs), which are 5G base station nodes. An Entity constituting the core network may be referred to as a core network entity.

The core network entity may denote a 5GC-C or 5GC-U as described below, or a set of one or more 5GC-Cs or 5GC-Us.

Meanwhile, a 5G base station may include a central unit (CU) and a distributed unit (DU), which are separated from each other. Alternatively, in the 5G base station, one or more DUs may be connected to one CU.

The present disclosure relates to a procedure of a UE for performing a handover from a base station configured into a 5G network, to which the UE is currently attached, to a base station configured into a typical LTE network. Accordingly, in the present disclosure, the base station is described by being divided into a source base station employing 5G radio access technology, for example, a gNB, a 5G RAN, or a 5G base station, and a target base station employing LTE radio access technology, for example, an eNB, an LTE RAN, or an LTE base station. In addition, if needed, the base station may denote a radio access technology employed by the base station.

Further, in the present disclosure, a core network entity is described by being divided into a core network entity linked to a source base station employing the 5G network technology, for example, a 5G CN, a 5G core network entity, or an AMF, and a core network entity linked to a target base station employing the LTE network technology, for example, an LTE EPC, an LTE core network entity, or an MME. If needed, the core network entity may denote a network technology employed by the core network entity.

Thus, a base station and a core network entity are described in order to discuss a handover of a UE between heterogeneous networks, but not limited to the term or word thereof.

Hereinafter, in accordance with at least one embodiment of the present disclosure, a handover procedure of a UE is discussed referring to the accompanying drawings.

Typical LTE radio networks support a handover between LTE base stations and a handover between an LTE base station and a 3G base station.

However, with the introduction of a new radio access technology and a network technology (5G technology) for meeting various requirements, it is essential to provide mobility for interworking with a typical LTE base station. In particular, compared to typical LTE base stations being deployed with high density on a large scale, the 5G base station will have limited coverage at the early stage of the deployment. Therefore, close cooperation with the LTE base stations will be required. Accordingly, a handover procedure between base stations each employing a network technology different from the other is essentially required to provide services to a UE. In particular, in case the 5G base station uses a mmWave frequency (e.g., 28 GHz frequency), the coverage of the base station will be narrowed according to frequency characteristics. Accordingly, a handover to/from an LTE base station deployed with relatively broad coverage will occur frequently.

In addition, while the LTE base station is connected to an EPC core network, the 5G base station is connected to a 5G-CN core network, and therefore it is necessary to provide an efficient handover procedure between the 5G base station and the LTE base station taking into account both whether an interface is supported between these core networks and a new 5G protocol function.

To address such a situation, in accordance with some embodiments of the present disclosure, a method is discussed for providing inter-RAT or inter-System mobility in order to provide mobility between the 5G and the LTE, which are heterogeneous wireless networks.

FIG. 1 is a diagram illustrating inter-system mobility or inter-RAT mobility and an interworking structure between networks each employing a network technology different from the other.

Referring to FIG. 1, a 5G network include a core network (CN, 125) and a radio access network (RAN, 115) and is connected to an external network being a data network (DN, 130). The 5G-CN (125), which is a 5G core network, may support both 5G and eLTE base stations 115, while a typical LTE base station 110 may be connected to a typical EPC 120 only. The eLTE is an enhanced version of the typical LTE technology for meeting 5G requirements. The 5G-CN 125 and the EPC 120 core network nodes may be connected to each other through an NGx interface. However, the support of the directly connecting interface is optional for each deployed network.

In addition, interworking between the 5G-CN 125 and 5G/eLTE RAN 115 is performed through an NG interface, and interworking between the EPC 120 and the LTE RAN 110 is performed through a S1 interface.

A UE 110 may be equipped with wireless transmitters/receivers and protocols of both the 5G and the LTE.

Figure 2:
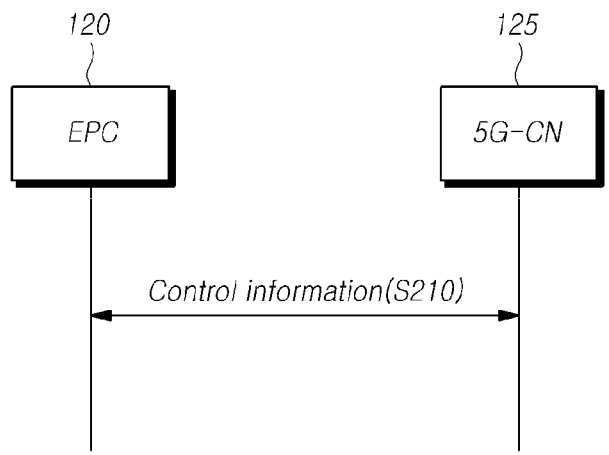
FIG. 2 is a diagram illustrating an interworking interface between core network entities each employing a network technology different from the other.

FIG. 2 is a diagram illustrating an interworking interface between core network entities each employing a network technology different from the other.

Referring to FIG. 2, the EPC 120 and the 5G CN 125 may exchange control information through a core network interworking interface (e.g., NGx or N26) between heterogeneous networks at step S210. That is, the EPC 120 and the 5G CN 125 may bidirectionally exchange control information for supporting inter-system mobility through the corresponding interface, and thus the EPC 120 and the 5G CN 125 may support a handover of a UE between heterogeneous networks.

As described above, since the 5G base station and the LTE base station are connected to different core networks from each other. There is a possibility that the directly connecting interface is not supported between them. Therefore, it is necessary to provide an inter-system or inter-RAT handover procedure, to address such an issue. In addition, since the 5G network and the LTE network are heterogeneous, there is a possibility that all of control plane (CP) devices and user plane (UP) devices of both the 5G core network and the LTE core network may be changed, in order to support a handover of a UE.

Unlike this case, 5G and eLTE base stations employing the NR technology are connected to the identical 5G-CN (or AMF) core network, and it is expected to support a directly connecting interface between the 5G base station and the eLTE base station. Accordingly, it is necessary to provide a handover procedure for supporting such a network configuration.

Hereinafter, operations of a UE, a source base station, a target base station, a source core network entity and a target core network entity are discussed for performing a handover between heterogeneous networks. Meanwhile, embodiments of the present disclosure will be described for a handover of a UE from a 5G base station to an LTE base station. However, the embodiments are not limited thereto. The embodiments will be applicable to a handover in the reverse situation in which related operating entities and message flows may be applied reversely.

Figure 3:
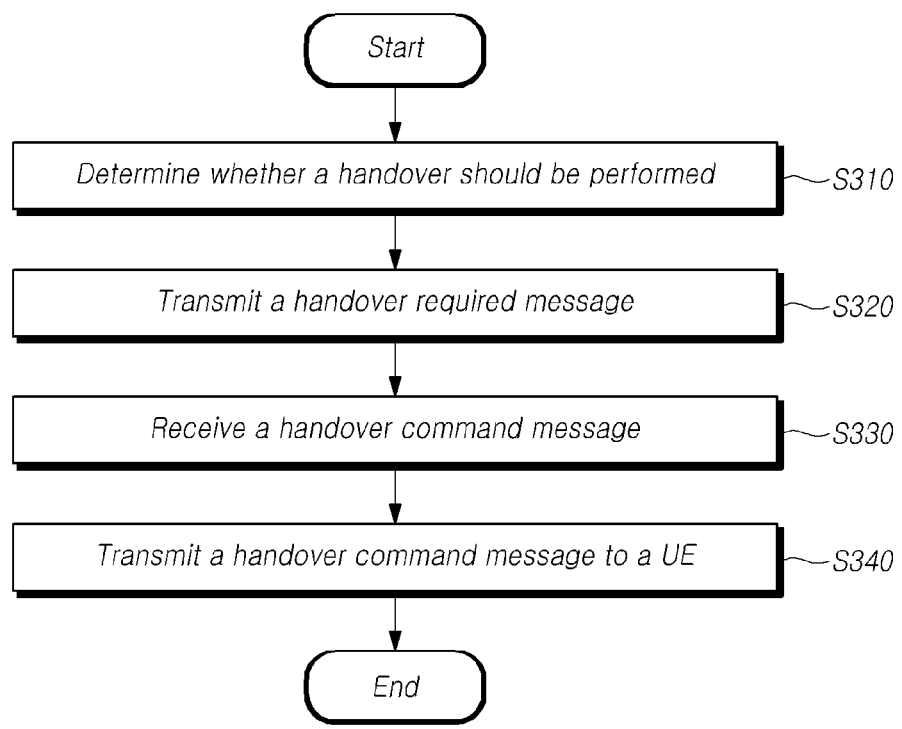
FIG. 3 is a flowchart illustrating operations of a source base station for controlling a handover of a user equipment between heterogeneous networks according to at least one embodiment of the present disclosure.

FIG. 3 is a flowchart illustrating operations of a source base station for controlling a handover of a UE between heterogeneous networks according to at least one embodiment of the present disclosure.

As shown in FIG. 3, a method of the source base station is provided for controlling a handover between heterogeneous networks. The source base station may determine whether the handover of the UE to a target base station belonging to a heterogeneous network should be performed based on measurement information received from the UE at step S310. For example, the UE may measure radio states of at least one of a 5G cell or an LTE cell, and then the source base station may receive measurement information from the UE.

The source base station may determine whether an inter-RAT handover is needed for the UE based on the received measurement information. For example, the source base station may determine the handover of the UE based on required bandwidth information, radio latency information, slicing capability information, or the like. More specifically, the source base station may determine that the handover of the UE is needed if a bandwidth additionally acceptable to a target base station is larger than a bandwidth being occupied between the source base station and the UE. As another example, the source base station may determine that the handover is needed if radio latency supported by a target base station is less than or equals to that of the source base station. As another example, the source base station may determine that the handover is needed if a network system linked to a target base station supports network slicing, or a network slicing capability of the target base station is higher than that of the source base station. In addition, the source base station may determine whether the handover of the UE to a heterogeneous network should be performed based on a predetermined criterion for determining the handover to the heterogeneous network.

Meanwhile, it is assumed that the UE is set to a single registration mode. For example, it is assumed that the UE is not allowed to register with two core networks simultaneously. However, embodiments of the present disclosure are applicable to a UE in a dual-registration mode, which is registered with two core networks simultaneously. Hereinafter, it is assumed that a source base station and a target base station employ different network technologies from each other. In addition, a core network entity linked to the source base station may be a core access and mobility management function (AMF), and a core network entity linked to the target base station may be a mobility management entity (MME). In case a UE is handed over to a 5G base station from an LTE base station to which the UE is attached, a core network entity linked to the source base station may be a mobility management entity (MME), and a core network entity linked to the target base station may be a core access and mobility management function (AMF).

In addition, if it is determined to perform the handover, the source base station may transmit a handover required message containing identification information of the target base station to a core network entity linked to the source base station at step S320. For example, if it is determined that a handover of the UE to the heterogeneous network is to be performed, the source base station may transmit a handover required message for requesting the handover of the UE to a core network entity (e.g., AMF) controlling the source base station.

The handover required message may contain at least one of the identification information of the target base station to which the handover is executed, and information for indicating bearers corresponding to quality of service (QoS) flows for data forwarding of the UE. For example, the source base station may receive, from the UE, the at least one of the identification information of the target base station and the information for indicating the bearers corresponding to the quality of service (QoS) flows for data forwarding of the UE.

For example, if the source base station transmits the handover required message to the core network entity, the core network entity may determine a type of handover based on the identification information of the target base station contained in the handover required message. For example, if the target base station is identified as a base station employing a heterogeneous network technology based on the identification information of the target base station, the determination of the handover type by the core network entity may result in an inter-system handover (e.g., a handover to an E-UTRAN base station).

As another example, the core network entity may identify a core network entity controlling the target base station by using the identification information of the target base station contained in the handover required message. For example, the core network entity may identify and determine an MME controlling the target base station.

Meanwhile, when the handover required message is received, and it is determined that a handover between heterogeneous networks is to be performed, the core network entity converts UE context for the corresponding UE in order to enable the corresponding heterogeneous network to recognize it. For example, the core network entity converts the UE context to evolved packet core (EPC) UE context and then transmits the converted context to a core network entity (e.g., MME) linked to the target base station.

In addition, the source base station may receive a handover command message containing evolved packet system (EPS) bearer setup list information of the target base station from the core network entity at step S330. The handover command message may contain the EPS bearer setup list information. The EPS bearer setup list information may be contained in control information that a core network entity linked to the target base station has received from the target base station and then transmitted to the core network entity linked to the source base station.

The source base station may transmit a handover command message to the UE at step S340. The source base station may transmit, to the UE to perform the handover, the handover command message containing the EPS bearer setup list information and information needed for enabling the UE to attach the target base station and perform the handover. For example, the source base station may receive, from the target base station through the core network entity, applicable parameters needed for enabling the UE to perform the handover to an LTE base station and transmit the received parameters to the UE.

The UE performs operations for executing the handover to the target base station based on the handover command message, and when the handover is completed, transmits a handover complete message to the target base station. The target base station transmits information on the completion of the handover to a core network entity linked to the target base station, and then the core network entity linked to the target base station sequentially transmits the information on the completion of the handover to the core network entity linked to the source base station. Thus, the UE may effectively complete the handover between heterogeneous networks.

Figure 4:
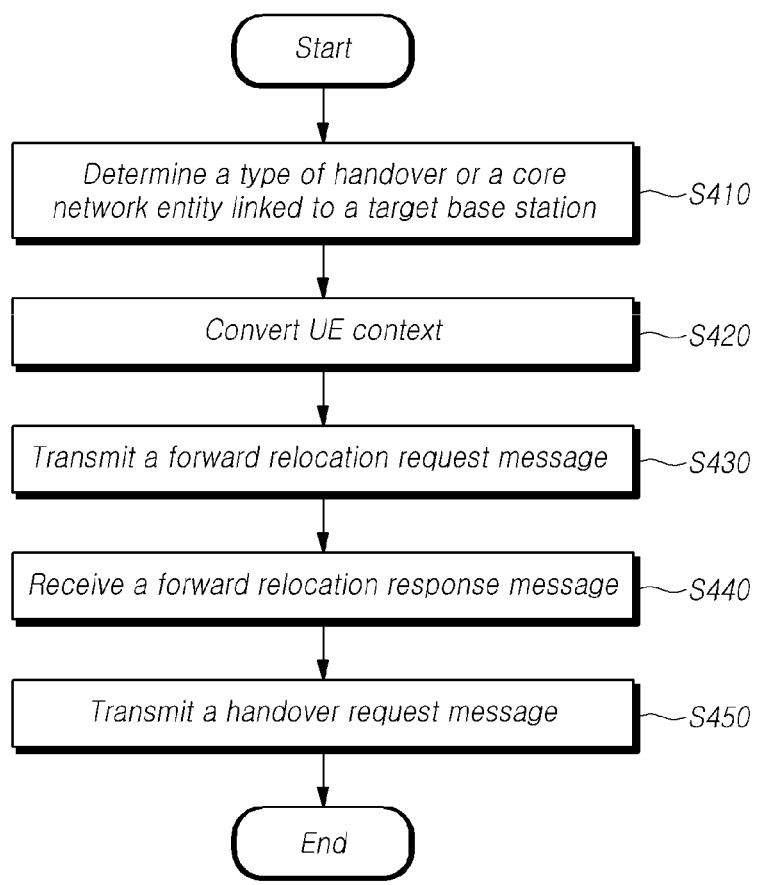
FIG. 4 is a flowchart illustrating operations of a core network entity linked to a source base station for controlling a handover of a user equipment between heterogeneous networks according to at least one embodiment of the present disclosure.

FIG. 4 is a flowchart illustrating operations of a core network entity linked to a source base station for controlling a handover of a UE to a heterogeneous network according to at least one embodiment of the present disclosure.

As shown in FIG. 4, the core network entity may determine a type of handover or a core network entity linked to a target base station for transmitting a forward relocation request message, by using identification information of the target base station contained in a handover required message at step S410. The core network entity may receive the handover required message from the source base station. For example, the handover required message may contain at least one of the identification information of the target base station to which the handover is executed, and information for indicating bearers corresponding to quality of service (QoS) flows for data forwarding of the UE. The at least one of the identification information of the target base station and the information for indicating the bearers corresponding to the quality of service (QoS) flows for data forwarding of the UE may be received by the source base station from the UE.

As an example, the core network entity may determine a type of handover based on the identification information of the target base station contained in the handover required message. For example, if the target base station is identified as a base station employing a heterogeneous network technology based on the identification information of the target base station, the determination of the handover type by the core network entity may result in an inter-system handover (e.g., a handover to an E-UTRAN base station).

As another example, the core network entity may identify a core network entity controlling the target base station by using the identification information of the target base station contained in the handover required message. For example, the core network entity may identify and determine an MME controlling the target base station.

In addition, the core network entity may convert UE context stored for the UE to perform the handover to evolved packet core (EPC) UE context at step S420. For example, the core network entity may convert the stored UE context to the EPC UE context and create it. As another example, the core network entity may map data flows to EPS bears or fallback from data flows to EPS bears. As still another example, the core network entity may convert a 5G NAS message to an LTE NAS message. As further another example, the core network entity may remove or fallback 5G slice configuration information. As yet another example, the core network entity may map and/or convert 5G security context to EPS security context. In addition, the core network entity may perform at least one operation of operations described above.

Meanwhile, the core network entity may transmit, to the core network entity linked to the target base station, a forward relocation request message containing the identification information of the target base station and the EPC UE context at step S430. For example, the core network entity may create a forward relocation request message containing at least one of target base station identification (ID) information, EPS UE context information, a direct forwarding flag, UE usage type information, and transmit the created message to the core network entity linked to the target base station.

Meanwhile, the core network entity linked to the target base station, which have received the forward relocation request message, transmits a handover request message containing an EPS bearer identification information list for setup to the target base station. The target base station allocates a required resource based on the handover request message and transmits a handover request acknowledgment message containing EPS bearer setup list information and applicable parameter information to the core network entity linked to the target base station.

In addition, the core network entity may receive a forward relocation response message containing the EPS bearer setup list information of the target base station from the core network entity linked to the target base station at step S440. The core network entity may receive, from the core network entity linked to the target base station, the forward relocation response message containing the EPS bearer setup list information transferred according to a handover required process between the core network entity linked to the target base station and the target base station. The forward relocation response message may contain applicable parameters that may be established by the UE in order to perform the handover.

In addition, the core network entity may transmit a handover command message containing the EPS bearer setup list information of the target base station to the source base station at step S450. The core network entity may transmit the handover command message to the source base station when receiving the forward relocation response message. For example, the handover command message may contain at least one of EPS bearer setup list information and applicable parameter information for a handover of the UE.

Meanwhile, it is assumed that the UE is set to a single registration mode, and the source base station and a target base station employ different network technologies from each other. In addition, a core network entity linked to the source base station may be a core access and mobility management function (AMF), and a core network entity linked to the target base station may be a mobility management entity (MME).

Thereafter, the UE performs operations for executing the handover to the target base station based on the handover command message. When the handover is completed, the UE transmits a handover complete message to the target base station. The target base station transmits information on the completion of the handover to a core network entity linked to the target base station, and then the core network entity linked to the target base station sequentially transmits the information on the completion of the handover to the core network entity linked to the source base station. Thus, the UE may effectively complete the handover between heterogeneous networks.

As described above, the source base station and the core network entity may control a handover of a UE to a heterogeneous network. The UE, the source base station, the core network entity linked to the source base station, the target base station, and the core network entity linked to the target base station may prepare, execute and complete the handover of the UE to a heterogeneous network, through operations described above.

Hereinafter, an overall procedure to perform a handover between heterogeneous networks including operations of the source base station and the core network entity described with reference to FIGS. 3 and 4 is discussed with reference to a related signal diagram.

It is assumed that a UE is not allowed to register with two core networks simultaneously. However, embodiments of the present disclosure are applicable to a UE in a dual-registration mode, which is registered with two core networks simultaneously.

Figure 5:
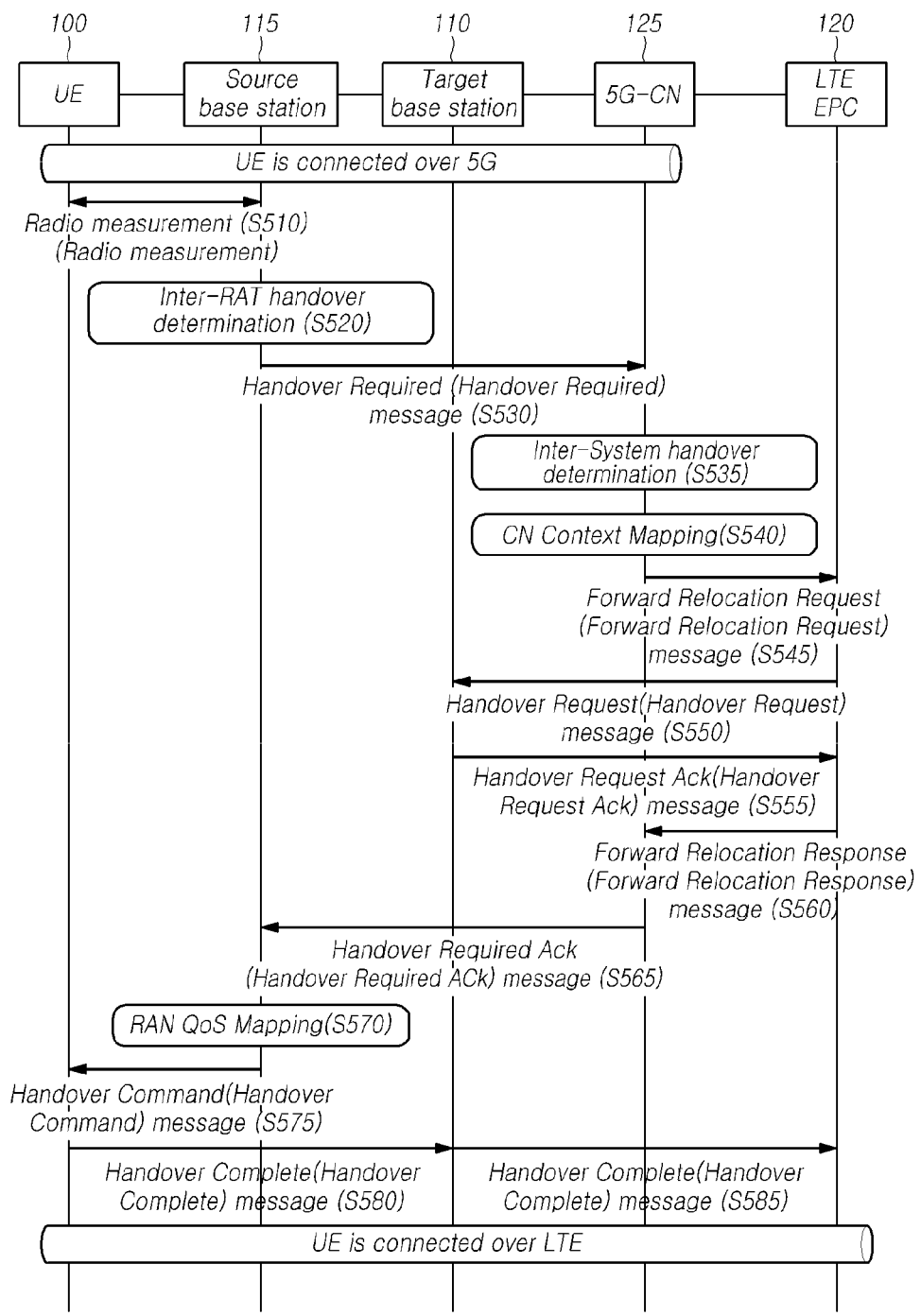
FIG. 5 is a signal diagram illustrating a handover procedure of a user equipment between heterogeneous networks according to at least one embodiment of the present disclosure.

FIG. 5 is a signal diagram illustrating a handover procedure of a UE between heterogeneous networks according to at least one embodiment of the present disclosure.

As shown in FIG. 5, a UE 100 is communicating with the 5G-CN 125. An inter-RAT handover is initiated by a source base station 115, and the source base station 115 provides configuration information needed for performing the handover to the UE 100. Here, the source base station 115 is connected to the 5G-CN 125 through an NG interface, and a target base station 110 is connected to an EPC 120 through a S1 interface. Accordingly, in case a handover occurs according to the movement of the UE 100, both the corresponding base station and the corresponding core network may be changed, and the UE 100 performs only a single transmission/reception function, as described above. In particular, such a handover procedure takes advantage of minimized service interruption because it is possible to set up a radio resource reservation by the target base station in advance. However, the 5G and the LTE have different CN contexts, different QoS frameworks, and a difference in whether slicing is supported or not, therefore it is necessary to establish a handover procedure taking these differences into account.

In case a handover is performed from an LTE base station to a 5G base station, in the opposite direction, entities 125 and 120 of FIG. 5 may be switched with each other, and specific operations and message flows for performing the handover are similar to those of FIG. 5.

In the following, each operation for performing the handover will be described.

The UE 100 is connected over a 5G network in single-registration mode and performs data communication therewith.

The 5G base station 115 transmits radio measurement related configuration information to the UE 100 through "RRCConnectionReconfiguration", which is an RRC message. The UE measures quality of 5G and LTE radio links using the radio measurement related configuration information, and if an inter-RAT handover event (e.g., similar to a B1/B2 event of a handover) occurs, transmits measurement information to the 5G base station 115 through a "Measurement Report" message at step S510. For example, the measurement information may contain a using frequency, a frequency bandwidth, a list of serving and neighboring cells, a reference signal received power (RSRP) or a reference signal received quality (RSRQ) of serving and neighboring cells, a list of candidate beams per each of serving and neighboring cells, a RSRP or a RSRQ of candidate beams, capabilities of the UE, capabilities of a base station (LTE base station or eLTE base station).

The source base station 115 checks whether the UE 100 meets requirements for performing an inter-RAT handover based on the measurement report, and determines that the handover to the target base station 110 is available if the requirements are satisfied at step S520. For example, the source base station 115 determines the inter-RAT handover with reference to determination criteria and measurement information for a 5G radio link and an LTE radio link, the state of the target base station 110, and the like.

Since there may be a big difference in frequencies and radio access technology (RAT) capabilities between 5G and LTE base stations, if needed, the source base station 115 is required to determine a handover taking such differences into account. For example, the source base station 115 may determine whether to accept the inter-RAT handover, taking into account all or part of items listed in Table 1. The items of Table 1 are examples and may be changed according to predefined items. The items of Table 1 may also be determined through QoS comparison resulted from combining the items.

TABLE 1

| Items | Handover acceptance condition |
|---|---|
| Required bandwidth | An inter-RAT handover is accepted if a bandwidth that is additionally acceptable to a target base station is larger than a bandwidth being used between a source base station and a UE. |
| Radio latency | An inter-RAT handover is accepted if latency supported by a target base station is less that or equals to that of a source base station. |
| Slicing capability | An inter-RAT handover is accepted if a network slicing capability supported by a target system is greater than or equals to that of a source system. It is noted that a network slicing capability of an LTE system may be configured to have at least one of a plurality of 5G network slicing capabilities. |

If it is determined that the inter-RAT is to be performed, the source base station 115 transmits a handover required message to a 5G-CN 125 (e.g., AMF) in order to report the inter-RAT handover at step S530. For example, the handover required message may contain at least one of a target base station identification (ID), transmission control information of a target radio access technology (RAT), and information for indicating bearers corresponding to quality of service (QoS) flows for data forwarding. The 5G-CN 125 may identify a target core network entity 120 based on the target base station ID. Furthermore, the 5G-CN 125 may determine a type of handover by using the identification information of the target base station 110 contained in the handover required message. For example, the determination of the handover type by the 5G-CN 125 may result in an inter-system handover.

Meanwhile, the 5G-CN 125 determines that the inter-system handover is available, if an NGx interface is supported between the 5G-CN 125 and the EPC 120 at step S535.

If the inter-system handover is available, the 5G-CN 125 converts 5G-CN UE context to EPC UE context at step S540. For example, the 5G-CN 125 may convert stored UE context to EPC UE context and create it. As another example, the 5G-CN 125 may map data flows to EPS bears or fallback from data flows to EPS bears. As further another example, the 5G-CN 125 may convert a 5G NAS message to an LTE NAS message. As still another example, the 5G-CN 125 may remove or fallback 5G slice configuration information. As yet another example, the 5G-CN 125 may map and/or convert 5G security context to EPS security context. In addition, the 5G-CN 125 may perform at least one operation of operations described above. The converting operation may differ depending on handover directions. The converting operation may be performed based on one or more procedures listed in Table 2.

TABLE 2

| 5G -> LTE handover | LTE -> 5G handover |
|---|---|
| Creating EPC UE context | Creating 5G-CN UE context |
| Mapping 5G flows to EPS bears or fallback from 5G flows to EPS bears | Mapping EPS bears to 5G flows |
| Converting a 5G NAS message to an LTE NAS message | Converting an LTE NAS message to a 5G NAS message |
| Removing/fallback 5G slice configuration information | Creating 5G slice configuration information |

Thereafter, the 5G-CN 125 transfers, to an EPC 120, information containing UE context converted for the EPC through a forward relocation request message at step S545. The forward relocation request message may be transmitted through an NGx interface.

The EPC 120 requests to perform the handover to the target base station 110 through a handover request message at step S550. For example, the handover request message may contain an EPS bearer identification information list.

The target base station 110 ☐) allocates a radio resource based on at least one of the EPS bearer identification information list, DRB setup information and the EPC UE context, ☐) generates a handover request acknowledge message containing at least one of the EPS bearer setup information list and applicable parameter information and ☐) transmits the generated message to the EPC 120 at step S555. For example, the handover request acknowledge message may contain UE RRC full configuration information containing a data radio bearer (DRB) setup.

The EPC 120 notifies the 5G-CN 125 that the target base station 110 is ready for the handover through the forward relocation response message at step S560. The forward relocation response message may contain information contained in the handover request acknowledge message.

The 5G-CN 125 transmits a handover required acknowledge message to the source base station 115 in order to indicate that preparation for handover is completed at step S565. The handover required acknowledge message may contain a handover command message. If the NGx interface is not available, the operations S540 to S560 are not performed, and information on not supporting the inter-System handover is notified to the source base station 115 through the handover required acknowledge message.

The source base station 115 performs a RAN QoS mapping operation S570, indicates the handover into the target base station 110 to the UE 100 through the handover command message at step S575. For example, the QoS mapping may be differ depending on handover directions. The QoS mapping may be performed based on one or more procedures listed in Table 3.

TABLE 3

| 5G -> LTE handover | LTE -> 5G handover |
| --- | --- |
| Mapping EPS bearers to LTE DRBs by an LTE base station | Mapping QoS flows to 5G DRBs by a 5G base station |

If the inter-System handover is not supported, the source base station 115 may request the UE 100 to perform a Release with Redirection procedure instead of the handover command message.

The UE 100 attaches to the target base station 110 based on at least one of the EPS bearer setup list information, the DRB information and the bearer configuration information, contained in the handover command message, and transmits a handover complete message to the target base station 110. The target base station 110 transfers handover complete message to the EPC 120.

If the inter-System handover is not available, the UE 100 newly performs an attachment request and performs operations for connecting.

Meanwhile, each operation described above may be skipped, added to another, or changed in order if needed.

As described above, when performing a handover between heterogeneous networks, the UE exchanges information needed for performing the handover by using the interface between the 5G-CN and the EPC.

Figure 6:
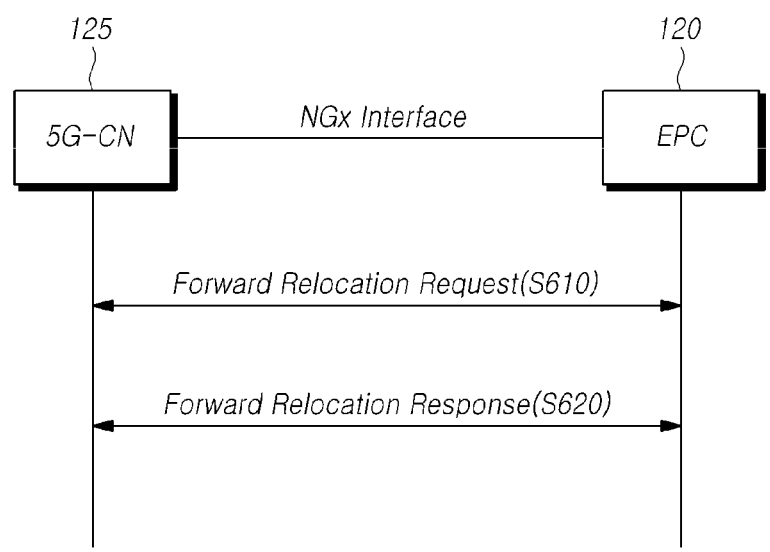
FIG. 6 is a signal diagram illustrating messages between core network entities for performing a handover procedure of a user equipment between heterogeneous networks according to at least one embodiment of the present disclosure.

FIG. 6 is a signal diagram illustrating messages between core network entities for performing a handover procedure of a UE between heterogeneous networks according to at least one embodiment of the present disclosure.

As shown in FIG. 6, a 5G-CN 125 transmits a forward relocation request message to an EPC 120 at step S610. As described above, the forward relocation request message may contain at least one of target base station identification information, EPC UE context information, MM context information containing EPS security context, SM EPS UE context information containing default and indicated GBR bearer information, direct forwarding flag information, or UE usage type information.

The EPC 120 checks whether a handover is available to a target base station using the forward relocation request message and performs a handover preparation procedure. Thereafter, the EPC 120 transmits the forward relocation response message to the 5G-CN 125 at step S620. For example, the forward relocation response message may contain at least one of Cause information, List of Set Up RABs, EPS information, EPS Bearers setup list information, MME Tunnel Endpoint Identifier for Control Plane information, RAN Cause information, MME Address for Control Plane information, Target to Source Transparent Container information, Address information and TEID(s) for Data Forwarding information.

Thus, the 5G-CN 125 and the EPC 120 may transmit/receive information needed for performing the handover between heterogeneous networks through the NGx interface.

Figure 7:
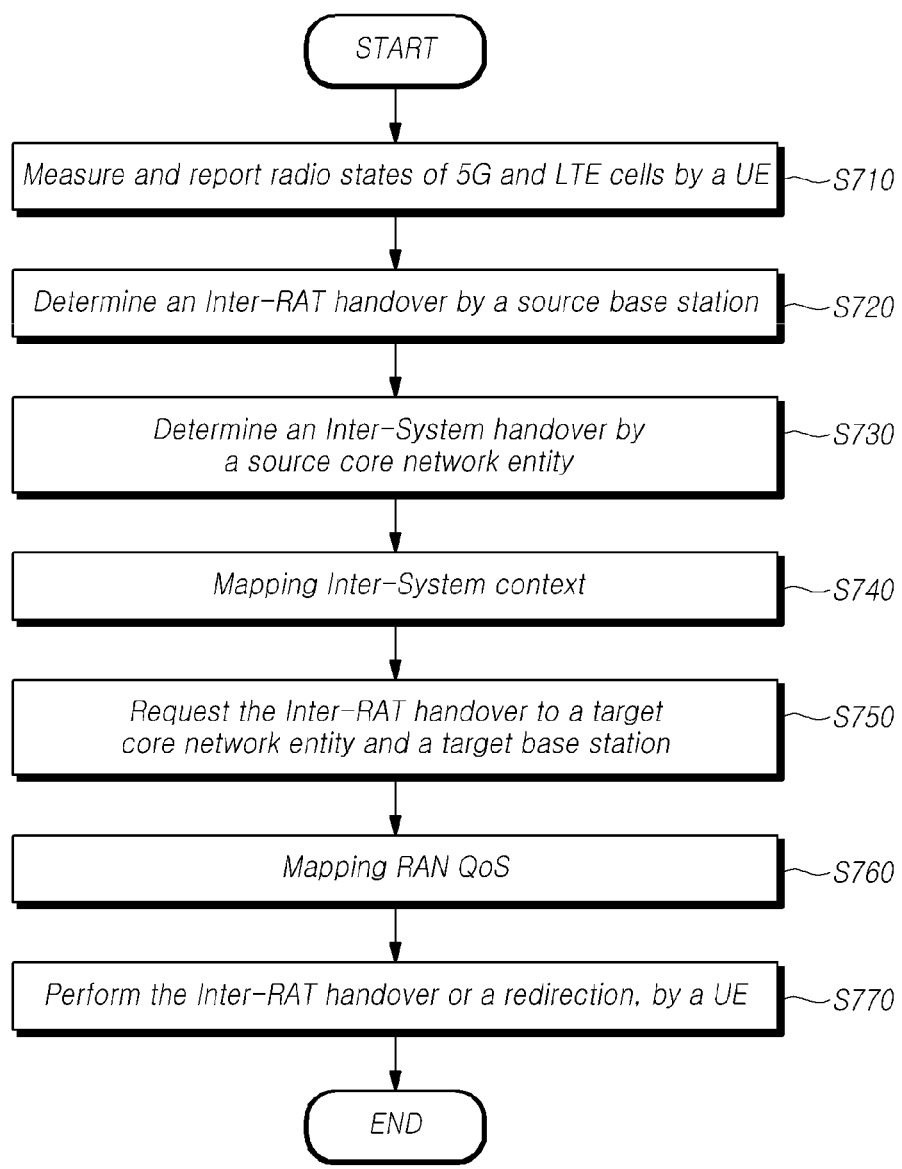
FIG. 7 is a flowchart illustrating a handover procedure of a user equipment between heterogeneous networks according to at least one embodiment of the present disclosure.

FIG. 7 is a flowchart illustrating a handover procedure of a UE between heterogeneous networks according to at least one embodiment of the present disclosure.

Referring to FIG. 7, a procedure for performing a handover between heterogeneous networks includes the following operations. A UE measures the radio quality of 5G and LTE cells (or radio links) and reports the measured results to a source base station at step S710. To do this, the UE may receive measurement configuration information for measurement from the source base station.

The source base station determines whether to initiate an inter-RAT handover based on the measurement report from the UE at step S720. In this case, the source base station may determine whether a predetermined criterion for performing the inter-RAT handover is satisfied.

If it is determined that the inter-RAT handover is needed, the source base station transmits a handover required message to a source core network entity (e.g., AMF), and then the source core network entity determines whether to initiate an inter-System handover at step S730. For example, the source core network entity may identify a target core network entity, and determine a handover type.

If the inter-System handover is determined, the source core network entity converts UE context to EPC UE context and performs inter-System context mapping operations containing the converting operations, such as security context, etc. at step S740.

The source core network entity transmits a request for the handover to a heterogeneous network to a target core network entity through a forward relocation request message, and the target core network entity requests the inter-System handover to a target base station through a handover request message at step S750. Through this, operations of EPS bearer setup, radio resource allocation, and the like are performed for performing the handover.

Thereafter, the target core network entity transfers EPS bearer setup list information, parameters for configuring DRBs, and the like to the source core network entity through a forward relocation response message, and the source core network entity maps RAN Qos using the received information and data at step S760. The source base station transfers information received from the core network entity to the UE through a handover command message and commands to perform the handover.

The UE receives the handover command message and performs the inter-RAT handover. Or when received a command indicating that the inter-RAT handover is not available, the UE may perform a redirection procedure through initial attachment to the target base station at step S770.

As described above, the UE may perform a handover from a 5G base station through which it is performing communication to an LTE base station employing another radio access technology, and thus may provide service continuity to a user.

Hereinafter, referring to related drawings, a source base station and a core network entity are described for performing all or part of embodiments described above with reference to FIGS. 1 to 7.

Figure 8:
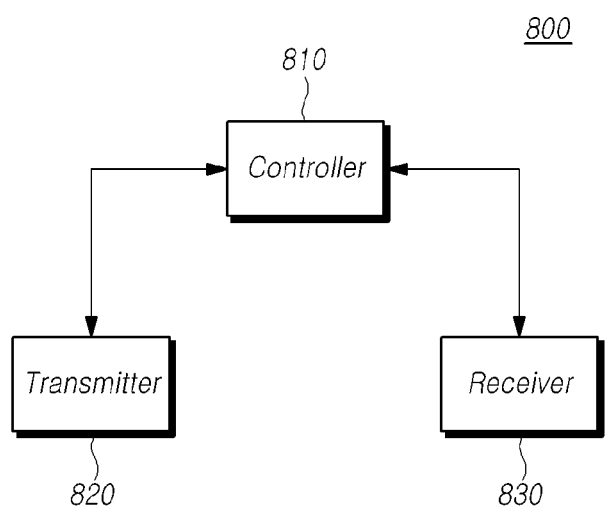
FIG. 8 is a block diagram illustrating a source base station according to at least one embodiment of the present disclosure.

FIG. 8 is a block diagram illustrating a source base station according to at least one embodiment of the present disclosure.

Referring to FIG. 8, a source base station 800 may include a controller 810, a transmitter 820, and a receiver 830. The controller 810 may be configured to determine whether a UE should be handed over to a target base station linked to a heterogeneous network based on measurement information received from the UE. The transmitter 820 may be configured to transmit a handover required message containing identification information of the target base station to a core network entity linked to the source base station, when it is determined that the UE should be handed over. The receiver 830 may be configured to receive a handover command message containing EPS bearer setup list information of the target base station from the core network entity. The handover required message may contain at least one of the identification information of the target base station to which the handover is executed, and information for indicating bearers corresponding to QoS flows for data forwarding of the UE.

In addition, the transmitter 820 may be configured to transmit a handover command message to the UE. The handover command message may contain the EPS bearer setup list information. The EPS bearer setup list information may be contained in control information that a core network entity linked to the target base station has received from the target base station and then transmitted to the core network entity linked to the source base station. The receiver 830 may be configured to receive measurement information resulted from measuring a radio state of at least one of a 5G cell or an LTE cell, by the UE.

The controller 810 is configured to determine whether an inter-RAT handover is needed for the UE based on the received measurement information. For example, the source base station may determine whether the UE should be handed over based on required bandwidth information, latency information, slicing capability information, or the like.

Meanwhile, when the handover required message is received, and it is determined that a handover between heterogeneous networks is to be performed, the core network entity converts UE context for the corresponding UE in order to enable the corresponding heterogeneous network to recognize it. For example, the core network entity may convert the UE context to EPC UE context and then transmit the converted context to a core network entity (e.g., MME) linked to the target base station.

In addition, the controller 810 is configured to control overall operations of the source base station 800 needed for controlling the handover of the UE between heterogeneous networks described above, such as information transmission/reception with another entity, determination of the inter-RAT handover, handover command to the UE, and the like.

In addition, the transmitter 820 and the receiver 830 are configured to transmit or receive signals, messages, data required to perform embodiments described above to or from the UE and the core network entity linked to the source base station.

Figure 9:
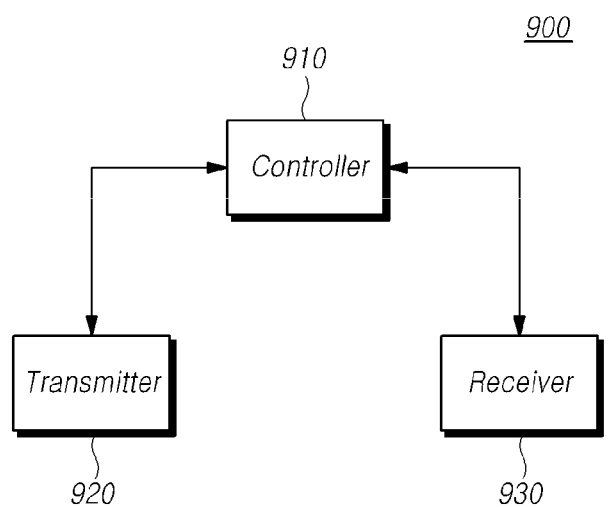
FIG. 9 is a block diagram illustrating a core network entity according to at least one embodiment of the present disclosure.

FIG. 9 is a block diagram illustrating a core network entity according to at least one embodiment of the present disclosure.

Referring to FIG. 9, a core network entity 900 may include a controller 910, a transmitter 920, and a receiver 930. The controller 910 may be configured to □) determine a type of handover or a core network entity linked to a target base station, to which a forward relocation request message is transmitted, using identification information of the target base station contained in a handover required message, and □) convert UE context stored for the UE to EPC UE context. The transmitter 920 may be configured to transmit the forward relocation request message containing the identification information of the target base station and the EPC UE context to the core network entity linked to the target base station. The receiver 930 may be configured to receive a forward relocation response message containing EPS bearer setup list information of the target base station from the core network entity linked to the target base station.

In addition, the transmitter 920 may be configured to transmit a handover command message containing the EPS bearer setup list information of the target base station to a source base station. The receiver 930 may be configured to receive the handover required message from the source base station. For example, the handover required message may contain at least one of the identification information of the target base station to which the handover is executed, and information for indicating bearers corresponding to quality of service (QoS) flows for data forwarding of the UE.

As an example, the controller 910 may be configured to determine a type of handover by using the identification information of the target base station contained in the handover required message. For example, if the target base station is identified as a base station employing a heterogeneous network technology based on the identification information of the target base station, the determination of the handover type by the core network entity may result in an inter-system handover (e.g., a handover to an E-UTRAN base station).

In addition, the controller 910 may be configured to identify a core network entity controlling the target base station by using the identification information of the target base station contained in the handover required message. For example, the controller 910 may be configured to identify and determine an MME controlling the target base station. In addition, the controller 910 may be configured to convert the stored UE context to the EPC UE context and create it. In addition, the controller 910 may be configured to map data flows to EPS bears or fallback from data flows to EPS bears. In addition, the controller 910 may be configured to convert a 5G NAS message to an LTE NAS message. In addition, the controller 910 may be configured to remove or fallback 5G slice configuration information. In addition, the controller 910 may be configured to map and/or convert 5G security context to EPS security context. In addition, the controller 910 may be configured to perform at least one operation of operations described above.

The transmitter 920 may be configured to create a forward relocation request message containing at least one of target base station identification (ID) information, EPS UE context information, a direct forwarding flag, UE usage type information and transmit the created message to the core network entity linked to the target base station.

In addition, the controller 910 may be configured to control overall operations of the core network entity 900 for providing more stable connectivity and seamless service continuity, even when a typical LTE network is utilized, through a handover between the 5G network and the LTE network, which are heterogeneous networks needed for performing embodiments described above.

In addition, the transmitter 920 and the receiver 930 are configured to transmit or receive signals, messages, data required to perform embodiments described above to or from the source base station and the core network entity linked to the target base station.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2017-0005590, filed on Jan. 12, 2017, Patent Application No. 10-2018-0002947, filed on Jan. 9, 2018 in Korea, the entire contents of which are incorporated herein by reference. In addition, this non-provisional application claims priorities in countries other than the U.S. for the same reason based on the Korean Patent Applications, the entire contents of which are hereby incorporated by reference.

The invention claimed is:

1. A method of a source base station for controlling a handover of a user equipment between heterogeneous networks, the method comprising:
   determining whether the user equipment should be handed over to a target base station belonging to a network based on measurement information received from the user equipment;
   transmitting a handover required message containing identification information of the target base station to a first core network entity linked to the source base station when it is determined that the handover is to be performed;
   receiving a handover command message containing evolved packet system (EPS) bearer setup list information of the target base station from the first core network entity; and
   transmitting the handover command message to the user equipment,
   wherein the user equipment is set to a single registration mode, and the source base station and the target base station employ different network technologies from each other, and
   wherein the first core network entity linked to the source base station is a core access and mobility management function (AMF), and a second core network entity linked to the target base station is a mobility management entity (MME).

2. The method according to claim 1, wherein the handover required message further contains information indicating bearers corresponding to quality of service (QoS) flows for data forwarding.

3. The method according to claim 1, wherein the first core network entity linked to the source base station determines a type of handover or the second core network entity linked to the target base station for transmitting a forward relocation request message, by using the identification information of the target base station contained in the handover required message.

4. The method according to claim 1, wherein the first core network entity linked to the source base station converts user equipment context stored for the user equipment to evolved packet core (EPC) user equipment context and transmits the converted context to the second core network entity linked to the target base station.

5. A method of a first core network entity linked to a source base station for controlling a handover of a user equipment between heterogeneous networks, the method comprising:
   determining a type of handover or a second core network entity linked to a target base station for transmitting a forward relocation request message, by using identification information of the target base station contained in a handover required message;
   converting user equipment context stored for the user equipment to perform the handover to evolved packet core (EPC) user equipment context;
   transmitting, to the second core network entity linked to the target base station, the forward relocation request message containing the identification information of the target base station and the EPC user equipment context;
   receiving a forward relocation response message containing EPS bearer setup list information of the target base station from the second core network entity linked to the target base station; and
   transmitting a handover command message containing the EPS bearer setup list information of the target base station to a source base station,
   wherein the user equipment is set to a single registration mode, and the source base station and the target base station employ different network technologies from each other, and
   wherein the first core network entity linked to the source base station is a core access and mobility management function (AMF), and the second core network entity linked to the target base station is a mobility management entity (MME).

6. The method according to claim 5, wherein the handover required message further contains information indicating bearers corresponding to quality of service (QoS) flows for data forwarding.

7. The method according to claim 5, wherein the second core network entity linked to the target base station transmits a handover request message containing an EPS bearer identification information list for setup to the target base station.

8. The method according to claim 7, wherein the target base station allocates a required resource based on the handover request message and transmits a handover request acknowledgment message containing the EPS bearer setup list information and applicable parameter information to the second core network entity linked to the target base station.

9. A source base station for controlling a handover of a user equipment between heterogeneous networks, the source base station comprising:
   a controller configured to determine whether the user equipment should be handed over to a target base station belonging to a heterogeneous network based on measurement information received from the user equipment;
   a transmitter configured to transmit a handover required message containing identification information of the target base station to a first core network entity linked to the source base station when it is determined that the handover is to be performed; and
   a receiver configured to receive a handover command message containing evolved packet system (EPS) bearer setup list information of the target base station from the first core network entity,
   wherein the transmitter further transmits the handover command message to the user equipment,
   wherein the user equipment is set to a single registration mode, and the source base station and the target base station employ different network technologies from each other, and
   wherein the first core network entity linked to the source base station is a core access and mobility management function (AMF), and a second core network entity linked to the target base station is a mobility management entity (MME).

10. The source base station according to claim 9, wherein the handover required message further contains information indicating bearers corresponding to quality of service (QoS) flows for data forwarding.

11. The source base station according to claim 9, wherein the first core network entity linked to the source base station determines a type of handover or the second core network entity linked to the target base station for transmitting a forward relocation request message, by using the identification information of the target base station contained in the handover required message.

12. The source base station according to claim 9, wherein the first core network entity linked to the source base station converts user equipment context stored for the user equipment to evolved packet core (EPC) user equipment context and transmits the converted context to the second core network entity linked to the target base station.

* * * * *